United States Patent [19]

Back

[11] Patent Number: 5,026,076
[45] Date of Patent: Jun. 25, 1991

[54] MECHANICAL FACE SEALS

[75] Inventor: Anthony C. Back, Slough, United Kingdom

[73] Assignee: John Crane UK Ltd., United Kingdom

[21] Appl. No.: 532,431

[22] Filed: Jun. 4, 1990

[30] Foreign Application Priority Data

Jun. 6, 1989 [GB] United Kingdom ............... 8913000

[51] Int. Cl.⁵ .................................. F16T 15/36
[52] U.S. Cl. ........................... 277/82; 277/27; 277/83
[58] Field of Search ............ 277/82, 83, 92, 177, 277/96, 96.1, 96.2, 27, 81 R, 85, 87

[56] References Cited

U.S. PATENT DOCUMENTS

| | | | |
|---|---|---|---|
| 2,760,794 | 8/1956 | Hartranft | 277/87 |
| 2,839,317 | 6/1958 | Haake | 277/85 |
| 4,427,204 | 1/1984 | Allen | 277/85 |
| 4,469,336 | 9/1984 | Linne | 277/92 |
| 4,552,368 | 11/1985 | Wallace | 277/83 |

FOREIGN PATENT DOCUMENTS 3008491 3/1980 Fed. Rep. of Germany .

*Primary Examiner*—William A. Cuchlinski, Jr.
*Assistant Examiner*—DePympo
*Attorney, Agent, or Firm*—Davis, Bujold & Streck

[57] ABSTRACT

A mechanical face seal for providing a seal between a shaft and a housing includes a first seal face member mounted on the shaft in fixed rotational and axial relationship and sealed with respect thereto and a second seal face member mounted in fixed rotational relationship but moveable axially of the housing; said second seal face member being sealed with respect to the housing by means of a sealing element, the sealing element being located in a groove defined between opposed surfaces of the second seal face member and housing, the wall of the groove between the sealing element and the side of the seal exposed to a product being defined by a low friction insert slidably mounted on the second seal face member and providing a close clearance with the housing.

5 Claims, 1 Drawing Sheet

MECHANICAL FACE SEALS

BACKGROUND TO THE INVENTION

The present invention relates to mechanical face seals and in particular to mechanical face seals which are subject to fluid pressure both internally and externally.

In mechanical face seals which are subject to, for example, a fluid product under pressure on one side and a fluid sealant under pressure on the other side, it is necessary to seal the axially moveable seal face member to its associated component in a manner which will provide a seal between the product and sealant regardless of which is at higher pressure. This may be achieved by providing an O-ring in a groove defined between the seal face member and its associated component, so that if the pressure of the product is higher, the O-ring will be forced into sealing engagement with one wall of the groove, whereas if the pressure of the sealant is higher, the O-ring will be forced into engagement with the other wall of the groove. With this arrangement, it is necessary to reduce the clearance between the seal face member and associated component in order to minimise extrusion of the O-ring.

If the product contains particulate material, there is a possibility that the small gap between the seal face member and associated component on the product side of the O-ring may become clogged, preventing free axial movement of the seal face member, so that as the seal faces wear the seal will leak.

SUMMARY OF THE INVENTION

According to one aspect of the present invention a mechanical face seal for providing a seal between a pair of relatively rotatable components comprises a first seal face member mounted in fixed axial and rotational relationship and sealed with respect to one component and a second seal face member maintained in fixed rotational relationship but moveable axially of the other component, said first and second seal face members being axially aligned so that opposed faces may be urged into sealing engagement, said second seal face member being sealed with respect to said other component by means of a sealing element located in a circumferential groove defined between opposed surfaces of the second seal face member and said other component, the wall of the groove between the sealing element and the side of the seal exposed to a product being defined at least in part by a low friction insert slidingly mounted on one of the opposed surfaces of the seal face member and said other component and a close clearance with the other opposed surface.

With the above seal, if the small gap between the low friction insert and said other opposed surface becomes clogged, axial movement of the second seal face member is still permitted by sliding of the low friction insert on said one of the opposed surfaces.

BRIEF DESCRIPTION OF THE DRAWINGS

The invention is now described, by way of example only, with reference to the accompanying drawings, in which.

DESCRIPTION OF A PREFERRED EMBODIMENT

Figure 1:
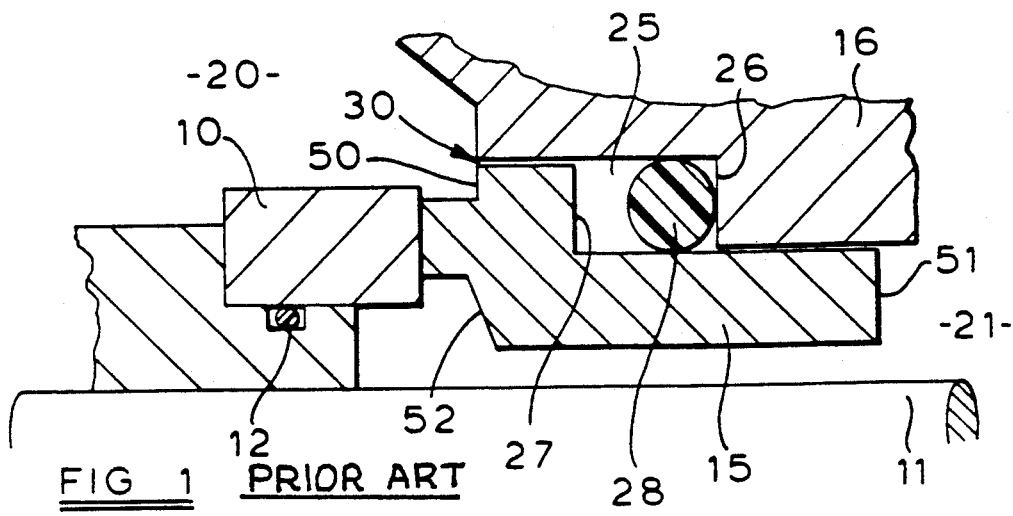
FIG. 1 shows in part sectional elevation, a mechanical face seal for providing a seal between a product area and a sealant area according to the prior art.

In the seal illustrated in FIG. 1, a first seal face member or seat 10 is mounted in fixed axial and rotational relationship with respect to a shaft 11 and is sealed with respect thereto by means of O-ring 12, in known manner.

A second seal face member 15 is slidingly located in a stepped bore in housing 16, the second seal face member 15 being constrained from rotation and urged into sealing engagement with the seat 10 in known manner.

The seat 10 and seal face member 15 thus provide a primary seal between an area 20 which is exposed to a fluid product under pressure and an area 21 which is exposed to a fluid sealant under pressure.

A groove 25 is defined between a shoulder 26 on the stepped bore of housing 16 and a shoulder 27 on the opposed surface of the seal face member 15. An O-ring 28 is located in the groove 25 to provide a secondary seal between areas 20 and 21, preventing leakage between the opposed surfaces of the seal face member 15 and housing 16. With this arrangement, when the pressure of the product is in excess of that of the sealant, the O-ring 28 is forced into sealing engagement with shoulder 26, while if the pressure of the sealant is in excess of that of the product, the O-ring 28 is forced into sealing engagement with the shoulder 27.

In order to avoid extrusion of the O-ring 28, the gap 30 between the housing 10 and seal face member 15 must be made as small as possible. This presents problems when the product contains particles which may clog the small gap 30. If the gap 30 becomes clogged, it will prevent relative axial movement between the seal face member 15 and housing 16, so that as the interengaging faces of the seat 10 and seal face member 15 wear, the seal will leak.

Figure 2:
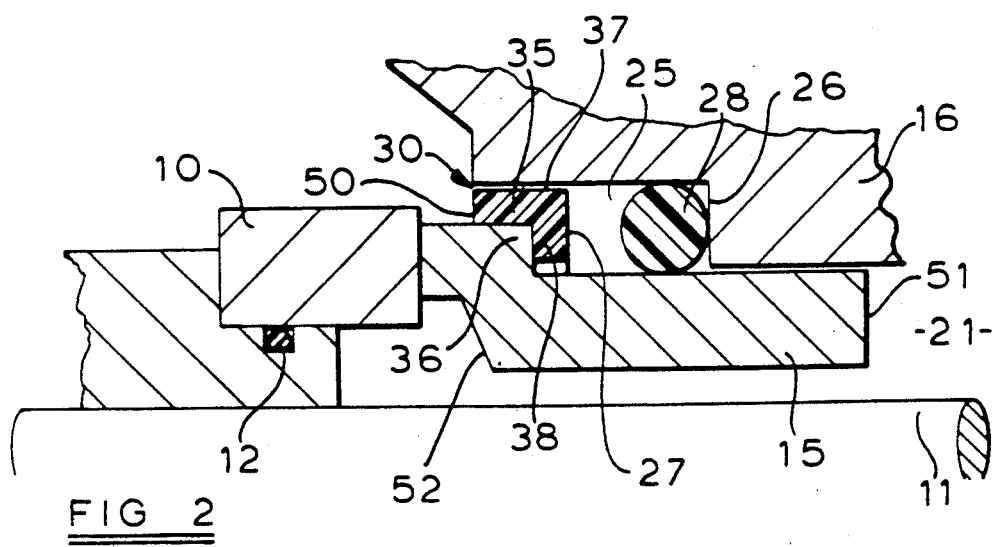
FIG. 2 shows in part sectional elevation a mechanical face seal in accordance with the present invention.

In the seal illustrated in FIG. 2, an annular insert 35 of L-section made of low friction material, for example PTFE, is slidingly located on a stepped portion 36 of the seal face member 15. The outer diameter 37 of the insert 35 is a close clearance with the opposed surface of the housing 16 to provide the small gap 30. The flange portion 38 of the insert 35 provides the shoulder 27 which defines one wall of groove 25.

Now, if the gap 30 between the insert 35 and housing 16 becomes clogged, the seal face member 15 may still move axially towards seat 10 to maintain sealing engagement between opposed end faces thereof, the seal face member 15 sliding with respect to the insert 35.

Figure 3:
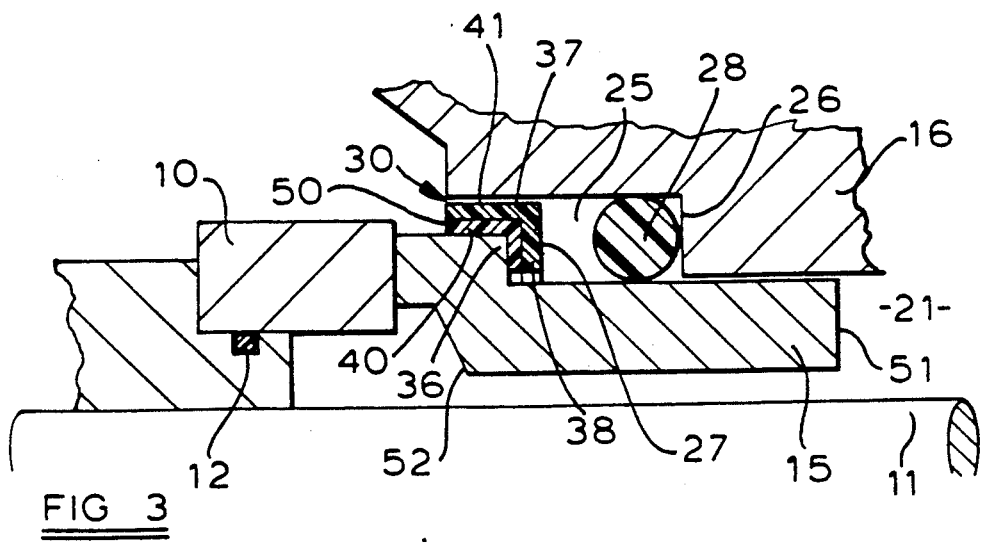
FIG. 3 shows in part sectional elevation an alternative form of seal in accordance with the present invention.

In the embodiment illustrated in FIG. 3, the insert 35 is made from two L-section rings, 40,41, made of PTFE or other low friction material. One ring 40 is slidingly located on the seal face member 15 and within the other ring 41. By this means, two slip paths are provided between the seal face member 15 and housing 16, should the gap 30 become clogged.

With seals of the type covered by the present invention, it is necessary to balance the radial areas exposed to the product and sealant fluids so that the pressure acting on the seal face member 15 will result in a load urging the seal face member 15 into engagement with the seat 10, this load being a desired function of the pressure differential across the seal. In order to achieve this, in the seal illustrated in FIG. 1, the radial face 50 which is exposed to the product pressure is provided to balance the face defined by the shoulder 27 plus face 51 minus face 52, which are exposed to sealant pressure. In the seals in accordance with the present invention, the face 50 may be defined by the insert 35, thereby simplifying the section of the seal face member 15 and reducing machining thereof.

Various modifications may be made without departing from the invention. For example, while in the above embodiments, the insert 35 slidingly engages the seal face member 15 and provides a close clearance with the housing 16, the insert may alternatively slidingly engage the housing 16 and provide a close clearance with the seal face member 15. Also the seal face member 15 may be mounted in fixed rotational relationship but moveable axially of the shaft 11 and the seat 10 mounted in fixed rotational and axial relationship with the housing 16. While an O-ring 28 is used for secondary sealing in the above embodiments, any suitable shape of sealing element may be used.

I claim:

1. A mechanical face seal for providing a seal between a pair of relatively rotatable components comprising a first seal face member mounted in fixed axial and rotational relationship and sealed with respect to one component and a second seal face member mounted in fixed rotational relationship but moveable axially of the other component, said first and second seal face members being axially aligned so that opposed faces may be urged into sealing engagement, said second seal face member being sealed with respect to said other component by means of a sealing element located in a circumferential groove defined between opposed surfaces of the second seal face member and said other component, the wall of the groove between the sealing element and the side of the seal exposed to a product being defined at least in part by a low friction insert slidingly mounted on one of the opposed surfaces of the seal face member and said other component and a close clearance with the other opposed surface.

2. A mechanical face seal according to claim 1 in which the insert is of L-section, the insert being slidably located on a stepped portion of the second seal face member, the flange of the insert defining one wall of the groove between the opposed surfaces of the second seal face member and said other component.

3. A mechanical face seal according to claim 1 in which the insert is formed from a plurality of rings, slidably located one inside another.

4. A mechanical face seal according to claim 1 in which the insert is made of PTFE.

5. A mechanical face seal according to claim 1 in which the insert defines a radial face which is exposed to fluid under pressure for pressure balancing purposes.

* * * * *